April 14, 1925. 1,533,793
G. FAILLA
STOPCOCK
Filed Dec. 13, 1919 2 Sheets-Sheet 1
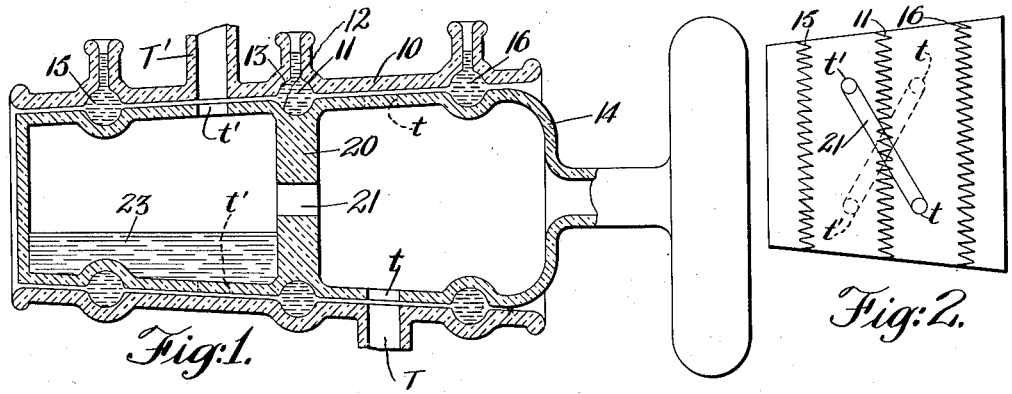
Fig. 1. Fig. 2.
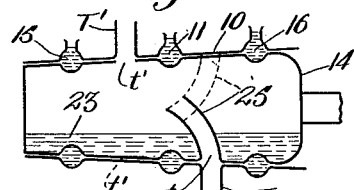 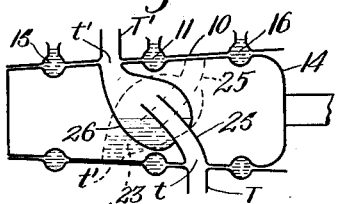
Fig. 3. Fig. 4.
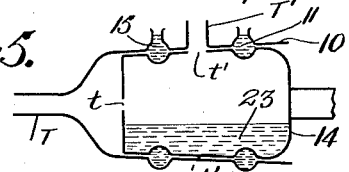 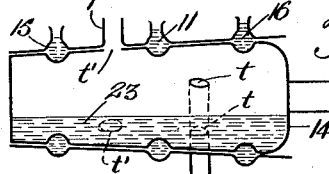
Fig. 5. Fig. 6.
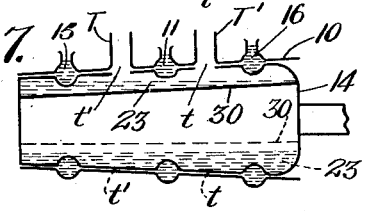 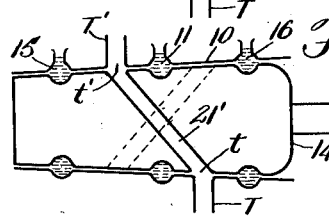
Fig. 7. Fig. 8.
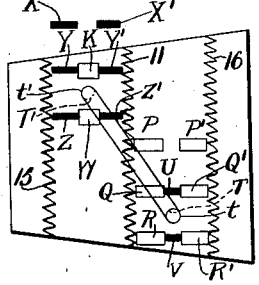 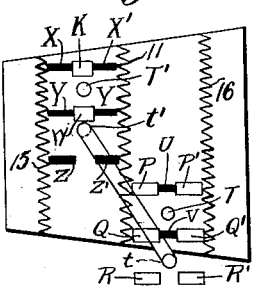 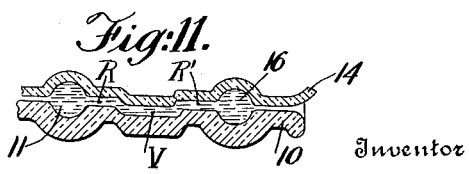
Fig. 9. Fig. 10. Fig. 11.
Inventor
Gioacchino Failla
By Edwards, Sager & Bower
his Attorneys

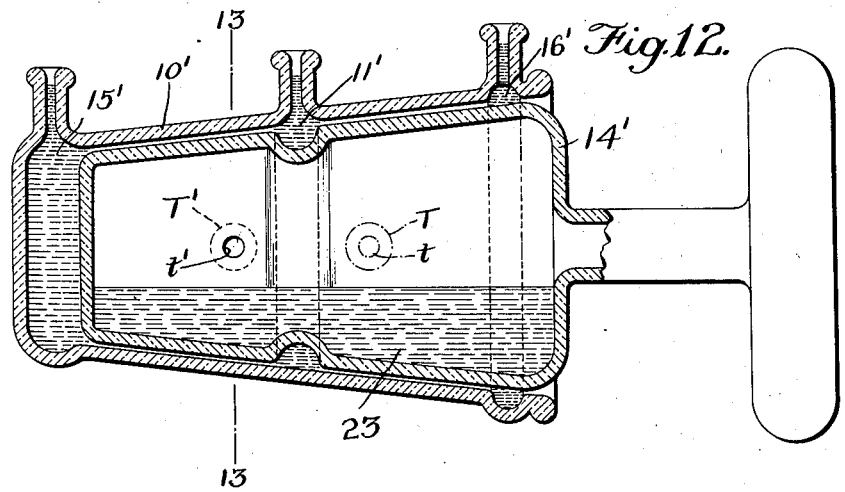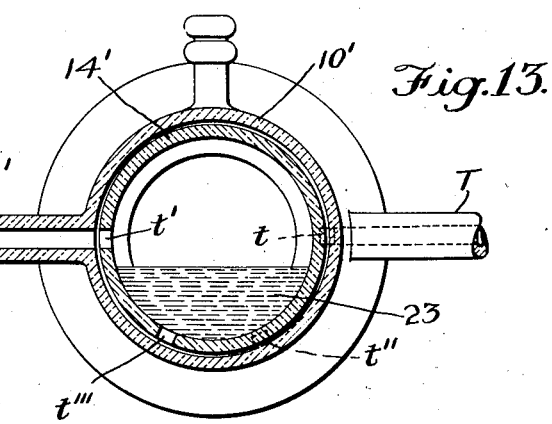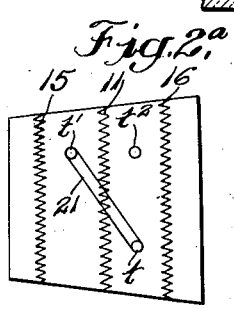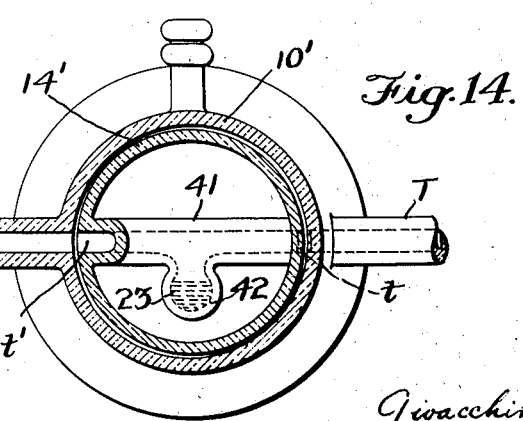

UNITED STATES PATENT OFFICE.

GIOACCHINO FAILLA, OF NEW YORK, N. Y.

STOPCOCK.

Application filed December 13, 1919. Serial No. 344,522.

*To all whom it may concern:*

Be it known that I, GIOACCHINO FAILLA, a citizen of the United States, residing at New York, in the county of New York and State of New York, have invented certain new and useful Improvements in Stopcocks, of which the following is a specification.

This invention relates to valves for fluid conduits and particularly to glass stop cocks commonly used in many kinds of apparatus. The chief object of the invention is to provide a valve which when closed will be absolutely sealed against leakage.

Another object of the invention is to provide bearing surfaces between the movable parts which will not stick but will give a light even resistance to movement.

A further object of the invention is to so form the parts and construct them of different material in such manner that temperature variations will be compensated for and will not tend to bind the movable parts against turning.

In the accompanying drawings illustrating the invention—

Fig. 1 is a vertical sectional view of a stop cock illustrating one embodiment of the invention.

Fig. 2 is a diagrammatic development of the frame bearing of the cock illustrated in Fig. 1.

Fig. 2ª is a digrammatic development similar to Fig. 2 but illustrating a modification.

Figs. 3, 4, 5, 6, 7, 8, 12, 13 and 14 are sectional views of modified forms of stop cocks.

Figs. 9 and 10 are diagrammatic developments of the form of cock illustrated in Fig. 8, and Fig. 11 is a sectional view of a detail of the same.

One difficulty in the operation of stop cocks is the tendency of the stopper to become bound against turning. The application of viscous lubricants to the binding surfaces has proven unsatisfactory not only on account of the hardening of the lubricant necessitating frequent renewal of the same, but also on account of the contamination of the fluids passing through the stopcock.

To overcome these objections the structure of this invention provides contacting surfaces of the stopper and frame made of such materials as will require no lubrication, or from a different point of view, it may be said that solid lubricant or lubricants are used between the glass surfaces. For instance, the ground surface of the glass stopper may be coated with silver by electroplating or by a silvering process or with platinum by sputtering under high heat or an electric discharge, the ground surface of the frame may also be coated with lead or graphite by rubbing a stick of the substance over the surface; then the two are put together and the stopper is rotated until the surfaces are highly polished. Under these conditions the stopper will turn evenly and smoothly.

To further avoid uneven action and binding between the rubbing surfaces of the stopcock in this invention the two parts are made of different kinds of glass. The combination is such that the temperature coefficient of expansion of the frame is larger than that of the stopper. For example the frame may be made of ordinary glass and the plug of "Pyrex" glass or the frame may be made of lead glass and the plug of ordinary or "Pyrex" glass. With this arrangement a rise in temperature will tend to loosen the stopper so that, in case of accidental mechanical binding between the parts, it is only necessary to warm the cock to expand the frame out of its grip on the stopper. In addition, when the stopcock is manipulated, the heat of the hand and the heat developed by friction between the moving surfaces tends to make the stopper turn more easily rather than make it bind.

Combined with these accurately fitting smoothly turning surfaces the structure of this invention provides liquid seals against leakage of the fluid passing through the stop cock so that the same is securely trapped. As illustrated in Fig. 1 the inflow pipe or tube T and the outflow T′ are connected with the stopper frame 10 on opposite sides of an intermediate sealing ring 11 formed for instance by mercury in annular grooves 12 and 13 of the stopper 14 and frame 10 respectively. Similar additional sealing rings 15 and 16 may also be provided at the ends of the stopper between the passing fluid and the air.

In the embodiment of the invention illustrated in Fig. 1 the stopper 14 is hollow and provided with a diaphragm 20 between the inlet opening $t$ and the outlet opening $t'$ and this diaphragm has an opening 21 so that in open position (full lines Fig. 1) the fluid passes from tube T through inlet $t$ to one side of the diaphragm 20 then through opening 21 to the other side and out by outlet $t'$ and tube T'. The closed position of the stopper 14 reached by 180° rotation is indicated by the dotted line positions of inlet $t$ at the top and $t'$ at the bottom. In this position the parts are sealed against further passage of the fluid by the ring 11 and the stopper wall closing the tubes T and T'. Should there be a seepage of fluid from tube T around the stopper and into inlet $t$, it will be trapped in the stopper by mercury 23 covering outlet $t'$ in its lower closed position (dotted lines Fig. 1).

The open and closed positions of the stopper are illustrated in Fig. 2 on the diagrammatic development of the frame, the passage through the stopper being represented by a diagonal tube in full lines for open position and dotted lines for closed position.

The modified form of stop cock shown in Fig. 3 is similar in principle to that of Fig. 1 except that diaphragm 20 is replaced by a short tube 25 extending inwardly from inlet $t$ and which in lower open position (full lines Fig. 3) opens upwardly above the mercury 23 and in upper closed position (dotted lines Fig. 3) has its end above the surface of the mercury 23 sealing the outlet $t'$ in its lower closed position. The stop cock of Fig. 4 is similar to that of Fig. 3 but has an additional bulb portion 26 holding the mercury 23, receiving the fluid from short tube 25, and passing it on to outlet $t'$. This bulb confines the fluid and reduces the quantity left in the stop cock at each operation.

In Fig. 5 is illustrated a stop cock in which the inlet pipe T is directed along the axis of the stopper at right angles to the outflow through T'. In this form the end sealing ring 15 is used as a seal between the pipes T and T' and the outlet $t'$ in its lower position is sealed by the mercury 23.

In all of the preceding forms the seal is absolute against flow from pipe T to pipe T' but leakage is possible in the opposite direction by seeping from pipe T' around the stopper, in through outlet $t'$, up through mercury 23 then back through inlet $t$ into pipe T, unless a seal is provided as by dipping the end of tube 25 (Fig. 4) below the mercury surface in closed dotted line position. It is sometimes desirable to also provide against this "back leakage" from pipe T' to pipe T and in such case structures such as illustrated in Figs. 6 to 11 may be resorted to.

In the device of Fig. 6 the pipes T and T' both lead into the frame above the surface of the sealing mercury 23. The inlet $t$ and outlet $t'$ are positioned to simultaneously register with pipes T and T' in open position and also to be simultaneously below the level of the mercury when in lower closed position. The stop cock of Fig. 7 is similarly formed but has both tubes T and T' at the top and a partition 30 which confines the mercury 23 and greatly reduces the area of the stopper passage between $t$ and $t'$.

In the Fig. 8 modification a diagonal passage 21' leads directly from inlet $t$ to outlet $t'$ and mercury barriers are interposed between pipe T and inlet $t$ and also between pipe T' and outlet $t'$ when the stopper is moved to closed position. These barriers are also present in the open position of the stopper as indicated in the diagram (Fig. 9) where the barriers of openings T $t$ are the mercury strips QUQ' and RVR' between mercury rings 11 and 16. Q Q' and R R' represent grooves in the stopper and U and V mating intermediate grooves in the frame as indicated in Fig. 11, the grooves communicating with each other to form continuous barriers. Additional stopper grooves P P' are provided and as the stopper turns from open to closed position (Fig. 10) grooves R R' move away from groove V and stopper grooves Q Q' replace them while the third set of stopper grooves P P' take the place of grooves Q Q' at each end of frame groove U. Thus at either open or closed position the barriers are complete. It is necessary to thus break the continuity of the barriers during the movement of the stopper as otherwise the mercury would rise into or flow into the opening $t$ as it passed over a barrier. Similarly with the opening $t'$ and tube T'. These are sealed by barriers YKY' and ZWZ' in open position (Fig. 9) and by barriers XKX' and YWY' in closed position (Fig. 10) grooves K and W being in the frame and grooves XX', YY' and ZZ' being in the stopper and all of the barriers extending between sealing rings 15 and 11. The passages in either open or closed position are thus sealed against leakage in either direction.

In some cases it may be desirable to provide an extra opening $t^2$ to give communication between one of the tubes T or T' and the inside of the stopper in the closed position of the latter. For instance where the stop cock is being used between a vacuum pump and the chamber being exhausted the stop cock passages could be exhausted while in closed position and in advance of the opening of communication between the pump and the chamber. Such an extra opening $t^2$ would be opposite to the opening $t$ as indicated in Fig. 2$^a$, where it is assumed that pipe T is connected to a vacuum pump and pipe T' to the chamber to be exhausted.

In Fig. 12 the invention is illustrated embodied in a stopper for a horizontal conduit T T'. The hollow plug 14' has three seals 15', 11' and 16' between it and the frame 10'. Seal 11' intervenes between tubes T and T' and openings t, t' are provided registering respectively with said tubes in the open position. Turning the plug 90° in either direction will close the stop cock. When the pressure in tube T is higher than in T' the plug will be turned in closing to carry opening t upward and opening t' downward below the surface of the mercury 23 so that any leakage from T will be trapped above the surface of the mercury. Additional openings t'' and t''' may be added to open either tube T or T' above the surface of the mercury in closed position of the stopper so that a vacuum pump may exhaust the air in the stopper before the latter is opened. Fig. 14 shows a modification in which a diagonal tube 41 connects openings t and t' and has a bulb reservoir 42 for the mercury 23 in open position. It is obvious that in either closed position of the plug the mercury 23 will cover and seal the lower opening t or t'.

While this invention has been explained in connection with glass stop cocks and mercury seals it is understood that other materials and other liquid seals may be used and the invention is not confined to the specific embodiments shown and described but it is intended to cover such modifications thereof as fall within the scope of the appended claims.

I claim:—

1. In a valve the combination with a frame having a bearing with curved surfaces completely circular around a central axis, of a stopper turning in said bearing surfaces and having a passage and means whereby a turning of said stopper moves said passage downward to receive a liquid seal acting to seal said passage.

2. In a valve the combination with a frame having a bearing with curved surfaces circular around a central axis, of a stopper turning in said bearing and having a passage and means whereby a turning of said stopper moves said passage downward to receive a liquid seal, acting to seal said passage, which flows downward by gravity to seal said passage.

3. In a valve the combination with a glass frame having a bearing with curved surfaces completely circular around a central axis, of a glass stopper turning in said bearing surfaces and having a passage and means whereby a turning of said stopper moves said passage downward to receive a liquid seal acting to seal said passage.

4. In a valve the combination with a frame having a bearing with curved surfaces completely circular around a central axis, of a stopper turning in said bearing surfaces and having a passage extending transversely across said stopper and means whereby a turning of said stopper moves said passage downward to receive a liquid seal acting to seal said passage.

5. In a valve the combination with a frame having a bearing surface with port openings one at a higher level than the other, of a stopper turning in said frame and having a passage connecting said ports in one position, and means whereby a turning movement of said stopper moves said passage downward to receive a liquid seal acting to seal said passage.

6. In a valve the combination with a frame having a bearing surface with port openings one at a higher level than the other, of a stopper turning in said frame and having a passage connecting said ports in one position, and means carried by said stopper whereby a turning movement of said stopper moves said passage downward to receive a liquid seal acting to seal said passage.

7. In a valve the combination with a frame of a glass stopper therefor and a silver-graphite lubricant between said frame and stopper.

8. In a valve the combination with a frame, of a glass stopper therefor and a thin film of metal lubricant coating the meeting surfaces of said frame and stopper.

9. In a valve the combination with a frame having a relatively high temperature coefficient of expansion of a stopper of glass having a relatively low temperature coefficient of expansion.

10. In a valve the combination with a frame having a relatively high temperature coefficient of expansion, of a stopper of Pyrex glass having a relatively low temperature coefficient of expansion.

11. In a valve the combination with a valve having a frame of lead glass, of a stopper of glass of different composition having a lower coefficient of expansion.

GIOACCHINO FAILLA.